United States Patent [19]

Davis

[11] 3,943,264

[45] Mar. 9, 1976

[54] WHEY PRODUCT

[75] Inventor: Paul F. Davis, Addison, Ill.

[73] Assignee: Kraftco Corporation, Glenview, Ill.

[22] Filed: Mar. 11, 1974

[21] Appl. No.: 450,205

Related U.S. Application Data

[63] Continuation-in-part of Ser. No. 248,966, May 1, 1972, abandoned, which is a continuation-in-part of Ser. No. 134,505, April 15, 1971, abandoned.

[52] U.S. Cl. ............ 426/330.2; 426/334; 426/583; 426/653; 426/654; 426/662
[51] Int. Cl.² .................................. A23C 9/00
[58] Field of Search ............ 426/21, 152, 153, 154, 426/185, 186, 227, 330.2, 334, 583, 653, 654, 662

[56] References Cited
UNITED STATES PATENTS

| | | | |
|---|---|---|---|
| 2,555,514 | 6/1951 | Sharp et al. | 426/185 |
| 2,832,685 | 4/1958 | Scott | 426/185 |
| 3,061,442 | 10/1962 | Ward et al. | 426/186 |
| 3,248,229 | 4/1966 | Pader et al. | 426/156 |
| 3,343,964 | 9/1967 | Thomas | 426/185 |
| 3,669,678 | 6/1972 | Kraft | 426/21 |

*Primary Examiner*—Robert L. Lindsay, Jr.
*Assistant Examiner*—Peter Chin
*Attorney, Agent, or Firm*—Fitch, Even, Tabin & Luedeka

[57] ABSTRACT

A composition is provided which may be substituted for all or part of the milk solids used in the manufacture of food products. The composition includes whey solids, a proteinaceous material, a calcium source, a phosphate source, and a stabilizing agent. The stabilizing agent is selected from natural or artificial phosphorus containing lipid materials, anionic surface active agents other than fatty acids and the salts of fatty acids and mixtures thereof.

16 Claims, No Drawings

WHEY PRODUCT

The present application is a continuation-in-part of copending U.S. patent application Ser. No. 248,966, filed May 1, 1972 now abandoned which is a continuation-in-part of U.S. patent application Ser. No. 134,505, filed Apr. 15, 1971 now abandoned.

The present invention relates generally to an improved whey product and, more particularly, relates to an improved whey product which may be used as a general purpose substitute for all or part of the milk solids — not fat in a wide variety of food products, such as leavened baked products, such as bread and cakes, puddings, pie fillings and dried potato products.

In general, there are two types of baked products, these being leavened and unleavened products. Leavened baked products may in turn be divided into two types of baked products, these being yeast leavened products and chemically leavened products. Each of the type of baked products requires particular materials and particular proportions of materials to produce the desired finished product.

Yeast leavened baked products differ from chemically leavened products in that most yeast leavened baked products are produced from a dough, whereas most chemically leavened products are produced from a batter. The leavening action in yeast leavened products comes principally from carbon dioxide produced as a result of yeast activity. For the satisfactory production of yeast leavened baked products, it is necessary that the doughs be allowed a considerable fermentation period, during which the mechanical raising of the dough mass with yeast weakens the wall that envelops each air cell. This is known as "mellowing" of the dough and aided by thorough hydration and by the chemical effects of acids and other byproducts of yeast activity. The mellowing is needed primarily to insure the rapid increase of dough volume during the first part of the baking process without any appreciable pressure development within the loaf. If there is a high resistance to expansion at this time, many of the cell walls collapse which leads to an irregular structure with relatively large openings or holes in the crumb. While resistance to expansion is weakened during the mellowing period, it is necessary to avoid appreciable loss of gas-retaining capacity by the walls of individual air cells. The proper selection of ingredients and a properly balanced fermentation treatment have been the subject of much research in the production of yeast leavened dough products. The selection of proper ingredients is well known, and the substitution of less costly ingredients has been difficult in the production of yeast leavened dough products.

The batter used in the preparation of chemically leavened products differs from dough in the proportion of some ingredients used, the principal difference being the higher proportion of liquid material in the batter. Batters are quite fluid, while doughs are relatively high in plasticity. The leavening action in the manufacture of chemically leavened products comes from the release of carbon dioxide caused by the interaction of sodium bicarbonate with an acid or acid salt, usually a phosphate, aluminum compound or a tartrate. The acid should not react completely with the sodium bicarbonate during the mixing of the batter, the major release of leavening gases should come with exposure to oven heat to give the desired color and volume. Aeration is obtained by the decomposition of the sodium bicarbonate and the acid into carbon dioxide and water when subjected to baking temperatures.

In the preparation of chemically leavened baking products, there is no extensive mechanical working of the batter so as to mellow the batter as is the case with yeast leavened dough products. Proper mixing action is important in batter development to secure a creamy mass containing many evenly distributed miniature cells. The selection of ingredients is important in preparing chemically leavened baked goods. In this respect, the flour should be relatively low in protein content for minimum resistance to expansion and for reduction in toughness in the finished product.

The use of non-fat milk solids in chemically leavened and yeast leavened baked products has been well known and utilized for many years. Non-fat dry milk solids have permitted the use of desired moisture levels and furthermore, the non-fat dry milk solids strengthen the physical structure of the dough or batter and otherwise improve the handling characteristics of the dough or batter. The non-fat dry milk solids further act as a buffer and thereby give the dough or batter more tolerance to various bakery conditions.

Attempts have been made to substitute whey solids obtained from cheese manufacture for non-fat milk solids in the manufacture of yeast leavened and chemically leavened baked goods. U.S. Pat. No. 3,061,442 to Ward, et al., describes a whey composition which may be used in the manufacture of yeast leavened dough products. However, a successful whey composition for use in the manufacture of chemically leavened dough product has not yet been attained. As previously indicated, the requirements for ingredients and mixing in preparation of yeast leavened doughs is substantially different than the requirements for obtaining a chemically leavened batter. The various attempts which have been made to modify, fortify or enrich whey so that it could be substituted for non-fat dry milk in chemically leavened batters have not been wholly successful. In this connection, in the preparation of chemically leavened batter products, such as cakes, it is important that the batter rise during the initial baking and that the center of the baked product have a height at least equal to or higher than the edge of the product but not substantially higher. It has been a principal problem, in using whey additives in the manufacture of chemically leavened bake goods that the center of the product tends to sag or sink lower than the surrounding edge of the product. Also, the use of whey solids in chemically leavened batters tends to produce a very tender baked product which is crumbly and without sufficient strength to withstand required handling.

While not wishing to be bound by any theory, it is believed that the difficulty in providing a whey composition which is satisfactory for use in chemically leavened dough products is due to the differences in the manner in which air cells are created in chemically leavened batter as compared to the manner in which air cells are created in yeast leavened doughs. As previously indicated, the preferred flour for use in the manufacture of chemically leavened batter is one which is low in protein content. It is believed that the protein content of non-fat milk solids aids in the formation of extensible pockets surrounding an air bubble which expands during baking of the dough and provides the desired structure. Also, the whey solids are rich in various minerals which further distrupt the chemical balance of the batter. For this and other reasons, the substitution of whey solids for milk solids has not been feasible in the manufacture of chemically leavened baked goods.

Accordingly, a principal object of the present invention is the provision of a whey product. Another object of the present invention is the provision of an improved whey product for use in various food products, such as chemically leavened baked goods, pudding and pie formulations, and dried potato products, wherein the whey product can be substituted for all or part of the non-fat milk solids.

In accordance with the present invention, a whey product is provided which may be substituted for all or part of the non-fat milk solids in the manufacture of chemically leavened baked goods, yeast leavened baked goods, puddings, pie fillings, cream fillings and dried potato products. The product includes whey solids, a proteinaceous material, a calcium source, a phosphate source and a small amount of a stabilizing agent. The stabilizing agent is selected from natural or artificial phosphorous containing lipid materials, anionic surface active agents other than fatty acids and salts thereof and mixtures thereof. THe stabilizing agent is added in an amount such as to provide a level of from about 0.5 to about 5 percent by weight of the stabilizing agent in the product.

Whey solids are obtained in the manufacture of various cheeses, such as in the manufacture of American type cheese, Swiss type cheese, Pasta Filata type cheese and cottage type cheese. In the manufacture of such cheeses, whey is provided which includes a substantial amount of milk sugar, milk salts, including calcium, sodium, phosphate and potassium ions, along with milk protein, primarily lactalbumin. Depending upon the type of cheese which is being made and the manner of carrying out the make procedure, the whey solids comprise somewhat different amounts of salts and protein. The total amount of protein is usually from about 8 percent to about 13 percent by weight of the whey solids on a dry basis. Furthermore, the whey solids will vary in pH, the higher acid make procedures providing whey solids with lower pH values and lower acid make procedures providing higher pH values to the whey solids. The whey from the manufacture of Swiss type cheese and American type cheese is preferred in the practice of the present invention, although whey from cottage type cheese and Pasta Filata type cheese and other wheys may also be used. The whey may be dried to provide whey solids prior to use in the whey product.

In general, the protein source may be selected from milk derived proteins, such as milk solids not fat, casein, caseinates and whey which has been treated to increase the protein level thereof; vegetable proteins, such as cottonseed meal, soy protein isolate and soy flour; egg albumin; yeast and mixtures thereof. The protein source is present at a level sufficient to provide from at least 18 percent to about 50 percent by weight of protein in the whey product.

The whey solids, protein source, calcium source, phosphate source, and the stabilizing agent are combined to provide a substantially dry whey product blend which may be used as a direct replacement for all or part of the skim milk solids in various food products. It is particularly preferred to provide an aqueous dispersion of the whey solids, protein source, calcium source, phosphate source and the stabilizing agent and to subsequently dry the aqueous dispersion by a suitable method, such as spray drying, to provide a substantially dry, homogeneous whey product blend.

For use in some food products, such as dried potato products, it is preferred to blend the stabilizing agent with remaining ingredients of the whey product after they have been obtained from an aqueous dispersion by drying.

As indicated, the stabilizing agent may be a phosphorous containing lipid material or an anionic surface active agent other than fatty acids or salts thereof. The phosphorous containing lipid material may be any mono or di substituted fatty acid glyceride wherin one of the carbons of the glycerol chain is combined with phosphoric acid. Preferred phosphorous containing lipids are phosphatides. A particularly preferred phosphatide is lecithin.

Pure chemical lecithin consists of glycerol combined with two fatty acid radicals, phosphoric acid and choline, and has a chemical structure as indicated below:

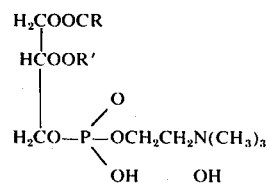

where R and R' are saturated or unsaturated fatty acid residues having a carbon chain length of from about 14 to about 22. R and R' may be the same or different fatty acid residue.

The lecithin of commerce is predominantly soy bean lecithin, although lecithin is also obtained from corn, peanuts, rape seed, cottonseed, castor seed and eggs. Commercial lecithin is generally marketed in combination with a glyceride oil. The glyceride oil may comprise from about 20 to about 50 percent of the composition. In the practice of the present invention, commercial lecithin containing some glyceride oil may be used, or pure chemical lecithin may be used. Both the alcohol soluble and alcohol insoluble fractions of lecithin may be used and the term "lecithin" as used herein is considered to include all of the forms of lecithin as discussed above. A typical analysis of oil free lecithin is as indicated below:

| Composition | Oil-Free Natural Lecithin | Alcohol Soluble Lecithin | Alcohol Insoluble Lecithin |
|---|---|---|---|
| Chemical lecithin | 29.5 | 60 | 4 |
| Chemical cephelin | 29.5 | 30 | 28.5 |
| Inositol phosphatides | 31.6 | 2.2 | 55 |
| Soy Bean Oil | 3.1 | 4 | 4 |
| Residue | 6.3 | 3.8 | 8.5 |

In general, it is preferred to use commercial liquid soy bean lecithin in the practice of the present invention. However, any of the commercially available forms of lecithin are suitable and may be used in the practice of the invention.

Other phosphorous substituted fatty acid materials may be used in the practice of the invention. A preferred phosphorous substituted fatty acid material is phosphated mono and diglycerides.

The anionic surface active agents which are suitable for use as stabilizing agents in the whey product of the invention are the reaction products of long chain fatty acids or fatty alcohols with short chain organic polycarboxylic acids or short chain hydroxy acids or the sodium or calcium salts of such reaction products. The short chain hydroxy acids may have a single hydroxyl and carboxyl group or may have two or more hydroxyl and carboxyl groups. It has been found that nonionic and cationic surface active agents are not suitable for use as stabilizing agents in the whey product of the invention. Also, the class of anionic surface active agents represented by the long chain fatty acids and their salts are not suitable for use as stabilizing agents.

In general, the long chain fatty acids or fatty alcohols used in providing suitable anionic surface active agents have a carbon chain length of from $C_{10}$ to $C_{22}$, preferably $C_{14}$ to $C_{20}$. It is particularly preferred to use the saturated $C_{18}$ fatty acid or fatty alcohol. The short chain organic polycarboxylic acid or hydroxy acid preferably has a carbon chain length of from $C_2$ to $C_6$. The preferred polycarboxylic acid is fumaric acid. The preferred hydroxy acid is lactic acid. Particularly preferred anionic stabilizing agents are stearoyl-2-lactylate, stearyl fumarate and the sodium and calcium salts thereof.

For certain food products, such as bread, cakes and puddings, it is preferred to use the phosphorus containing lipid materials as the stabilizing agent. For other food products, such as dried potato products, it is preferred to use the anionic surface active agents as the stabilizing agent.

The whey product of the present invention, as heretofore described, is suitable for replacement of non-fat milk solids in chemically leavened baked goods, such as cakes, without the use of calcium salts and phosphate salts. However, the whey product, without calcium salts and phosphate salts, is not suitable for replacement of part or all of the non-fat milk solids in other types of food products utilizing non-fat milk solids, such as bread, puddings, pie fillings, cream fillings, dried potato products, and the like. When the whey product, without calcium salts and phosphate salts, is used to replace a significant portion, i.e. from 80 to 100 percent by weight, of the non-fat milk solids in puddings, a loose textured, runny product is obtained. It has been discovered that the utility of the whey product of the invention is enhanced for use as a replacement for non-fat milk solids in various other food products, particularly bread, puddings and dried potatoes, by the presence of particular calcium salts and phosphate salts.

The calcium source and the phosphate source are selected from those salts which are at least partially soluble in water to provide calcium cation and phosphate anion. The ratio of calcium to phosphate is important to provide the benefits of the invention for certain food products. The molar ratio of calcium to phosphorus is in the range of from about 0.75:1.0 to about 1.5:1.0. It is also important to select calcium source and the phosphate source so as to establish a pH in the final product of from about 6 to about 8. The pH is determined by dispersing a sufficient amount of the dried whey product is deionized water to provide 10 percent by weight of the product in water and measuring the pH of the dispersion. Preferred calcium sources and phosphate sources are calcium oxide, calcium hydroxide, monocalcium phosphate, calcium lactate and mixtures thereof. The level of addition of the calcium source and the phosphate source is related to the pH requirements for the whey product. In general, however, the calcium source and the phosphate source are each added at a level of from about 0.2 to about 5.0 percent by weight of the whey product.

In the method of the present invention for preparing a whey product suitable for replacement of non-fat skim milk in various food products, the proteinaceous source is first solubilized. In respect to casein, a dispersion of casein is formed and a sodium source, such as sodium hydroxide is added to the casein to form soluble sodium caseinate. Generally, from about .003 to about .03 pounds of sodium per pound of casein is sufficient. The stabilizing agent is then added to the sodium caseinate solution.

In a separate step, the whey solids are dispersed in water to provide a dispersion of whey solids at a level of from about 30 to about 60 percent by weight. The phosphate source, preferably in the form of monocalcium phosphate, is added to the whey dispersion. The sodium caseinate solution is added to the whey dispersion under conditions of high-shear agitation. Thereafter, the calcium source, other than the calcium added in the form of a calcium phosphate salt, is hydrated with water and added to the mixture at a level sufficient to establish the desired pH. The whey caseinate dispersion may then be homogenized, pasteurized, cooled and spray dried. The spray dried powder prepared by the above method is similar in appearance and functionality to non-fat dry milk. The whey product is useful as a complete replacement for non-fat milk in various food products, such as cakes, bread, puddings, and dried potato products.

While not wishing to be bound by any theory, it is believed that the functionality of the whey product is attributed to the partial formation of multivalent cation partial salts of the protein. Calcium cation partially replaces sodium in the protein molecule. The phosphate anion which is present during the formation of the partial salt of the divalent cation acts to form calcium phosphate with a portion of the calcium cation and controls the concentration of calcium ion which reacts with the protein. Also, the calcium phosphate salts and partial calcium proteinate salts have white opacifying properties similar to milk. Such whitening properties are important in various food materials such as light colored foods and mashed potatoes which are formed from dry potato products.

The following examples further illustrate various features of the present invention, but are in no way intended to limit the scope of the invention, which is defined in the following claims.

EXAMPLE I

Layer cakes were prepared in accordance with a standard formulation and a standard mix and baking process. The formulation for each of the layer cakes was as follows:

| INGREDIENT | WEIGHT - GRAMS |
| --- | --- |
| Cake flour | 227 |
| Sugar (fine granulated) | 272.4 |
| Shortening (containing about 3 percent mono-diglycerides) | 100 |
| Salt | 8.5 |
| Baking Powder (double acting containing sodium pyrophosphate, bicarbonate of soda, cornstarch, monocalcium phosphate, and calcium | |

| INGREDIENT | WEIGHT - GRAMS |
| --- | --- |
| lactate) | 14.2 |
| Dairy ingredient | 17 |
| Dried egg white | 17.7 |
| Water | 330 |

A planetary type mixer with a five-quart bowl and a paddle were used for preparation of the batter for each layer cake. The dry ingredients were blended for two minutes at low speed in the mixer and the shortening was added. Half the water was added at low speed over a period of 15 seconds and mixing was continued for an additional 15 seconds. The bowl and the paddle were scraped and the batter was mixed for an additional two minutes at medium speed. The remaining water was then added over a period of 15 seconds at low speed and mixing was continued for an additional 15 seconds. The bowl and paddle were again scraped and the batter was mixed for an additional minute at medium speed.

The specific gravity of the batter was then measured and 400 grams of the batter was placed into a paper-lined, eight-inch diameter cake pan. The cakes were baked at 360° F. for 28 minutes or until done, as judged by center resiliency and shrinkage of the cakes from the sides of the pans, to provide cake layers. The cake layers were then cooled and the volume of the layers was measured. The cake layers were then removed from the pans and grain and texture were subjectively evaluated by observation of a cross-section of the cake layer taken through the center. A symmetry measurement was made; the symmetry measurement being the difference between the center height of the cake layer and the average of two measurements taken 2-½ inches from the center. A symmetry measurement of 2.5 mm or higher indicates desirably rounded cake contour.

As previously indicated, the usual dairy ingredient in the manufacture of chemically leavened baked products is milk solids not fat. Various cake layers were made in accordance with the standard formulation and procedure as described above. The only difference in the cake layers produced was in the substitution of various materials, including the whey product of the invention, for milk solids non-fat as the dairy ingredient in the formulation. The various cake layers which were produced and the dairy ingredient, or substitute therefor, used are set forth below in Table 1. Each of the cake layers produced was evaluated and the specific gravity of the batter, the volume of the cake layer and the symmetry of the cake layer was measured. Subjective comments with respect to the grain and texture of the cake layers are also set forth below in Table 1.

Table 1

| Cake No. | Dairy Ingredient | Batter SP.Gr. g/cc | Volume cc | Symmetry | Comments |
| --- | --- | --- | --- | --- | --- |
| 1 | Control (no dairy product) | 0.98 | 1125 | 3.50 | Rounded contour, pale crust color, tender texture |
| 2 | Milk Solids non-fat (MSNF) | 0.96 | 1100 | 2.25 | Weak center |
| 3 | Dried Cheddar whey | 0.98 | 1075 | 2.25 | Weak center |
| 4 | Dried Cheddar whey with 1% lecithin* | 0.98 | 1125 | 4.75 | Round contour |
| 5 | Dried cottage cheese whey (adjusted to pH 7.2 with NaOH prior to drying) | 0.93 | 1075 | 1.25 | Weak center |
| 6 | Dried cottage cheese whey (adjusted to pH 7.2 with NaOH prior to drying) with 1% lecithin* | 0.94 | 1108 | 5.50 | Rounded contour |
| 7 | 30% sodium caseinate, 70% dried Cheddar whey | 0.89 | 1075 | 1.25 | Weak center |
| 8 | 1% lecithin* 30% sodium caseinate, 69% dried Cheddar whey | 0.91 | 1117 | 5.25 | Rounded contour |
| 9 | 1% lecithin,* 30% sodium caseinate, 69% dried cottage cheese whey | 0.91 | 1125 | 4.75 | Rounded contour |
| 10 | 1% lecithin,* 30% sodium caseinate, 67% dried Cheddar whey, 1% calcium oxide, 1% monocalcium phosphate | 0.90 | 1125 | 3.00 | Rounded contour |

*Lecithin used was soy bean lecithin marketed by A.E. Staley Co. under the Tradename STA SOL BF.

As can be seen from Table 1, the addition of lecithin to whey products used to replace milk in the manufacture of cake layers provides cake layers with desirable contour in larger volume. As indicated, the combination of lecithin and whey alone provide cake layers with desirable symmetry and contour. However, a marked difference between cakes made with a combination of whey and lecithin and those prepared with a combination of whey, protein and lecithin is found in the grain structure. The provision of the protein provides a finer grain structure and a firmer texture with formation of dense center sections. The use of calcium salts and phosphate salts provides a cake texture which more closely resembles that of non-fat milk solids. This is important for commercial bakery operations where cakes are handled in mechanized equipment.

EXAMPLE II

A standard pudding formulation was prepared in accordance with the following procedure: 113.5 grams of granulated sucrose, 40.0 grams of dry dairy ingredient, and 1.5 grams of salt were mixed with 273 milliliters of water to provide a first mixture. The mixture was brought to a boil over direct heat with constant stirring and was then placed over boiling water in a double boiler. 28.4 grams of cornstarch was mixed with 50 milliliters of water and 91 grams of whole egg was blended therewith. The egg-cornstarch mixture was then added to the first mixture and the mixture was stirred for 3 minutes. 150 gram portions of the mixture were then poured into cups. The cups were allowed to cool for 15 minutes in ambient air and were then refrigerated overnight.

When non-fat milk solids were used as the dry dairy ingredient a firm pudding product with usual well known pudding properties was obtained.

1000 lbs. of a whey product for use as a dry dairy ingredient was prepared in accordance with the following formulation and method:

| Ingredient | Weight Percent |
|---|---|
| Casein | 20.0 |
| Lecithin | 1.0 |
| Ca $(H_2PO_4)_2$ $H_2O$ | .9 |
| Non-fat dry milk | 1.1 |
| NaOH | .6 |
| CaO | .6 |
| Whey Solids | 75.8 |

The whey product was prepared by the following method: The casein was added to sufficient water to provide a 17 percent by weight solids dispersion. The water was heated to a temperature of 140°F. and sufficient sodium hydroxide was added thereto to raise the pH to 8.0 and provide a soluble sodium caseinate. The lecithin was then added to the dispersion. The calcium phosphate was mixed with warm water (120°F.) and was added to the caseinate mixture with agitation. About two-thirds of the calcium oxide was hydrated with water and then added to the caseinate mixture. A sweet whey concentrate having 50 percent by weight whey solids was mixed with the remaining calcium oxide. The caseinate mixture was then combined with the whey concentrate in a jacketed kettle having cool water (70°F.) circulating in the jacket to provide an aqueous whey product dispersion. The dispersion was spray dried to provide a dry whey product having about 4 percent moisture.

The whey product, prepared by the method described above, was used as the dry dairy ingredient in a pudding formulation, as previously described. The pudding product was firm with the characteristic qualities of pudding prepared with non-fat milk solids.

EXAMPLE III

A whey product suitable for use as a replacement for milk in the preparation of a dry potato product was prepared in the following manner. 6.0 pounds of casein was added to 30 pounds of water (160°F.) with agitation. 0.17 pounds of sodium hydroxide, as an aqueous solution, was added to the casein dispersion to convert the casein to sodium caseinate.

In a separate tank, 24.0 pounds of cheddar cheese whey solids was dispersed in 24.0 pounds of water (70°F.). 0.37 pounds of monocalcium phosphate monohydrate was dispersed in 1.5 pounds of tap water and was added to the whey dispersion. The sodium caseinate was added to the whey dispersion under agitation conditions to provide a blend. Vigorous agitation was used to inhibit formation of caseinate aggregates.

0.17 pounds of calcium oxide, which had been hydrated in 0.84 pounds of water was added to the blend to adjust the pH to 6.3. The blend was heated to a temperature of 120°F. and homogenized at 2,000 psig. The blend was dried in a single stage dryer to provide a whey product having a moixture content of 4 percent by weight. Calcium stearoyl-2-lactylate was then blended with a portion of the dried whey product. The calcium stearoyl-2-lactylate was added at a level sufficient to provide 1 percent by weight of the calcium stearoyl-2-lactylate, based on the weight of the whey product.

Sodium stearoyl-2-lactylate was blended with another portion of the dried whey product at a level of 1 percent by weight.

A further whey product was prepared in accordance with the above described method wherein monosodium phosphate was used as the phosphate source instead of monocalcium phosphate.

The monosodium phosphate was added to the sodium caseinate at a level of 0.45 pounds and 0.09 pounds of calcium oxide, hydrated in water was added to the sodium caseinate. 0.18 pounds of calcium oxide was added to the blend as described above.

Portions of the dried whey product with monosodium phosphate were also combined with calcium stearoyl-2-lactylate and sodium stearoyl-2-lactylate as described above.

The various whey products described above were then evaluated as a replacement for milk in the preparation of whipped potatoes from dried potato granules. The evaluation of the whey products was made as follows. 1840 ml. of boiling water containing 5 grams of salt was poured into a 5 quart stainless steel bowl. 431 grams of potato granules which had been dry blended with 23 grams of the whey product or other additive were added to the hot water while mixing with a wire whip. The potato mixture was mixed for one minute at the number 1 setting on a mixer identified by the trade name Hobart N-50. This was followed by mixing at two and one-half minutes at setting number 3.

The textural properties, odor-flavor and color properties were subjectively determined. A smooth-appearing whipped potato with white color and soft consistency is desirable. No foreign odor or flavors should be present due to the whey product. A high yield is also desirable. The yield was determined by counting the number of number 10 ice cream scoops which can be obtained from the whipped potato mixture. The data in respect to the use of the various whey products is set forth in Table 3 below along with comparative samples using cheddar cheese whey alone and non-fat milk alone.

Table 3

FUNCTIONAL PROPERTIES OF DAIRY ADDITIVES IN POTATO GRANULES

| Sample No. | Additive | Yield | Texture and Consistency |
|---|---|---|---|
| 1 | Potato granules with no additive (control) | 24 | coarse, ragged texture, firm consistency |
| 2 | Cheddar cheese whey, alone | 24⅓ | does not appear any different from a potato product containing no dairy product |
| 3 | Non-fat dry milk, alone (prepared by low heat process) | 28⅔ | smooth texture, soft consistency |
| 4 | Whey product from Example IV (monocalcium phosphate) without stabilizing agent | 27⅓ | sl. coarse, ragged texture sl. firm consistency |
| 5 | Sample No. 4 with 1 percent calcium stearoyl-2-lactylate, dry blended | 29 | smooth texture, soft consistency |
| 6 | Sample No. 4 with 1 percent sodium stearoyl-2-lactylate dry blended | 28⅓ | smooth texture, soft consistency |
| 7 | Whey product from Example IV (monosodium phosphate) without stabilizing agent | 27⅓ | sl. coarse, ragged texture sl. firm consistency |
| 8 | No. 7 with 1 percent calcium stearoyl-2-lactylate, dry blended | 28⅔ | smooth texture, soft consistency |

From the above table it can be seen that the whey products of the present invention containing stabilizing agents of the invention are suitable for direct replacement of non-fat milk in the preparation of dried potato products.

What is claimed is:

1. A composition suitable for direct replacement of non-fat milk solids comprising whey solids, a proteinaceous material selected from the group consisting of from milk derived protein, soy flour, soy protein isolate, cottonseed meal, egg albumin, yeast and mixtures thereof, a calcium source, a phosphate source, and a stabilizing agent, said stabilizing agent being selected from phosphorus containing lipid materials and anionic surface active agents other than fatty acids and salts thereof, said stabilizing agent being present at a level of from about 0.5 to about 5 percent by weight of said composition, dry basis, said whey solids being present at a level of from about 40 percent to about 90 percent by weight of said composition, said proteinaceous material being present at a level sufficient to provide from at least 18 percent to about 50 percent by weight of total protein in said composition, said calcium source being present at a level of from about 0.2 to about 5.0 percent by weight of said composition and said phosphate source being present at a level of from about 0.2 to about 5.0 percent by weight of said composition and the ratio of calcium to phosphorus is in the range of from about 0.75:1.0 to about 1.5:1.0.

2. A composition in accordance with claim 1 wherein said proteinaceous source is selected from milk solids not fat, casein, caseinates, whey protein, soy protein isolate, soy flour and mixtures thereof.

3. A composition in accordance with claim 1 wherein said whey is obtained from the manufacture of Swiss type cheese, American type cheese, cottage cheese, cream cheese, Pasta Filata type cheese and mixtures thereof.

4. A composition in accordance with claim 1 wherein said stabilizing agent is lecithin.

5. A composition in accordance with claim 1 wherein said stabilizing agent is phosphated mono- and di-glycerides.

6. A composition in accordance with claim 1 wherein said stabilizing agent is selected from the sodium and calcium salts of stearoyl-2-lactylate.

7. A composition in accordance with claim 1 wherein said stabilizing agent is stearyl fumarate and the sodium and calcium salts thereof.

8. A composition in accordance with claim 1 wherein said composition has a pH in the range of from about 6 to about 8.

9. A method for preparing a whey product suitable for replacement of non-fat milk in various food products, the method comprising forming an aqueous dispersion of a proteinaceous source, said proteinaceous source being selected from the group consisting of from milk derived protein, soy flour, soy protein isolate, cottonseed meal, egg albumin, yeast and mixtures thereof solubilizing said proteinaceous dispersion by adding a sodium source to said dispersion, providing an aqueous dispersion of whey solids, adding to said aqueous whey dispersion a phosphate source, combining said proteinaceous dispersion and said whey dispersion, adjusting the pH of said combination to a pH within the range of from about 6 to about 8, said pH adjustment being made by adding a calcium source to said combination, drying said combination to provide a whey product, said whey being present at a level of from about 40 percent to about 90 percent by weight of the whey product and providing a stabilizing agent selected from phosphorus containing lipid materials and anionic surface active agents other than fatty acids and salts thereof in said whey product, said calcium source being present at a level of from about 0.2 to about 5.0 percent by weight of said whey product and said phosphate source being present at a level of from about 0.2 to about 5.0 percent by weight of said whey product and wherein the ratio of calcium to phosphorus is in the range of from about 0.75:1.0 to about 1.5:1.0.

10. A method in accordance with claim 9 wherein said stabilizing agent is added to said combination prior to drying said combination.

11. A method in accordance with claim 9 wherein said stabilizing agent is added to said whey product after said whey product is dried.

12. A method in accordance with claim 9 wherein said whey is obtained from the manufacture of Swiss type cheese, American type cheese, cottage cheese, cream cheese, Pasta Filata type cheese and mixtures thereof.

13. A method in accordance with claim 10 wherein said stabilizing agent is lecithin.

14. A method in accordance with claim 11 wherein said stabilizing agent is selected from the sodium and calcium salts stearoyl-2-lactylate.

15. A method in accordance with claim 10 wherein said stabilizing agent is present at a level of from about 0.5 to about 5 percent by weight of said whey product, dry basis.

16. A method in accordance with claim 11 wherein said stabilizing agent is present at a level of from about .5 to about 5 percent by weight of said whey product, dry basis.

* * * * *